Dec. 13, 1927.

G. W. SHAW 1,652,642

LUBRICATING SYSTEM

Filed June 22, 1923

INVENTOR
George W. Shaw
By
W. W. Williamson
Atty.

Dec. 13, 1927.

G. W. SHAW 1,652,642

LUBRICATING SYSTEM

Filed June 22, 1923

INVENTOR
George W. Shaw
By W. W. Williamson
Atty.

Dec. 13, 1927.

G. W. SHAW 1,652,642

LUBRICATING SYSTEM

Filed June 22, 1923

INVENTOR
George W. Shaw
By W. W. Williamson
Atty.

Dec. 13, 1927.　　　　　　　　　　　　　　　　1,652,642
G. W. SHAW
LUBRICATING SYSTEM
Filed June 22, 1923　　　　　　7 Sheets-Sheet 5

INVENTOR
George W. Shaw
By W. W. Williamson
Atty.

Dec. 13, 1927.

G. W. SHAW 1,652,642

LUBRICATING SYSTEM

Filed June 22, 1923

INVENTOR
George W. Shaw
By W. W. Williamson
Atty.

Dec. 13, 1927.  1,652,642
G. W. SHAW
LUBRICATING SYSTEM
Filed June 22, 1923   7 Sheets-Sheet 7

INVENTOR
George W. Shaw
By W. W. Williamson
Atty.

Patented Dec. 13, 1927.

1,652,642

UNITED STATES PATENT OFFICE.

GEORGE W. SHAW, OF PHILADELPHIA, PENNSYLVANIA.

LUBRICATING SYSTEM.

Application filed June 22, 1923. Serial No. 647,021.

My invention relates to new and useful improvements in a lubricating system, and has for its primary object the positive propulsion of a lubricant through suitable conduits to the various working parts of machinery so that they shall be positively lubricated at all times during operation. Such a system is particularly adapted for use on automobiles to lubricate the power plant, the running gear, the steering gear and the like.

Another object of the invention is to provide travelers to force a lubricant through a conduit whereby said lubricant may be distributed to the different parts to be lubricated.

Another object of the invention is to provide a traveler having threaded connection with a conduit, forming a part of a shaft or like revolving part, whereby said traveler will be propelled in one direction during the revolutions of the conduit.

Another object of the invention is to provide means to prevent the traveler from revolving during its passage through the conduit.

Another object of the invention is to provide simple and efficient means for transferring the travelers from one conduit to another in order to complete the circuit.

Another object of this invention is to provide a lubricant conveyor in the form of a flexible screw housed within a suitable casing or conduit.

Another object of the invention is to provide a flexible screw having a smooth central bore for the return of excess lubricant.

A further object of the invention is to provide a plurality of rigid, stiff or inflexible revoluble screws arranged within suitable conduits and so related to each other that a lubricant may be propelled or forced to different points.

A further object of the invention is to provide for forcing a lubricant through a hollow object due to the revolving action of said object.

A still further object of the invention is to provide for moving a lubricant forward within a hollow object by the centrifugal force produced by the action of said object and to prevent retrograde movement of said lubricant. Such an arrangement is particularly adapted for use in engine crank shafts.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figures 1, 2, 3, 4, 5:
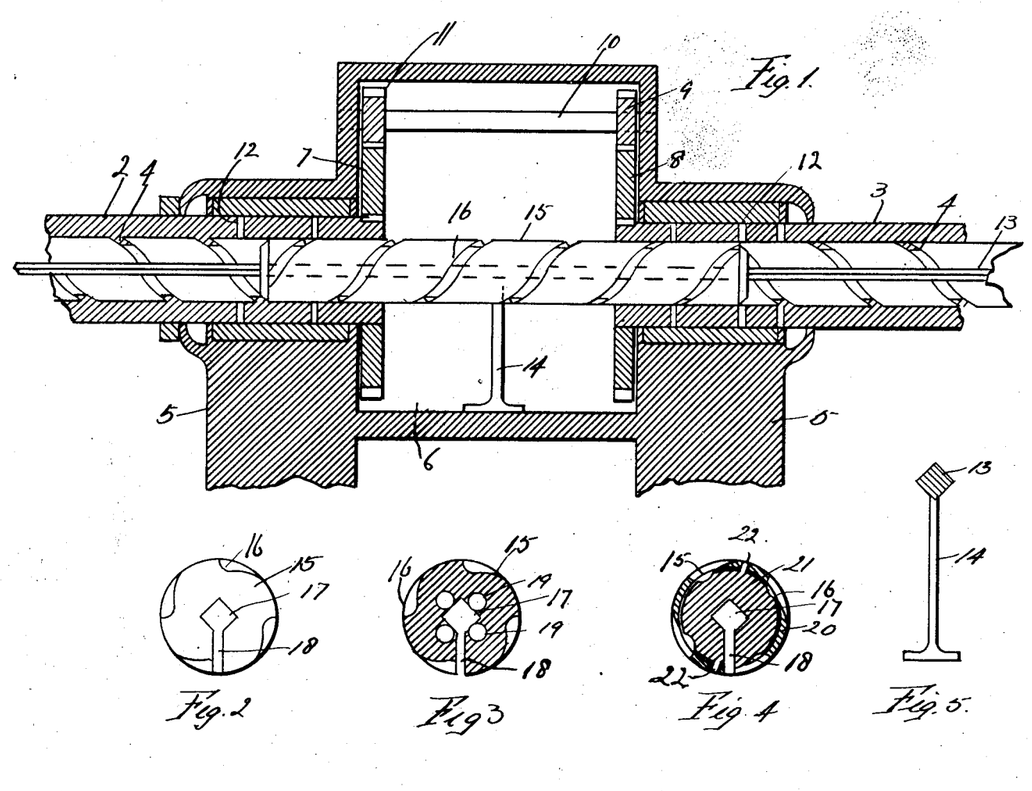
Fig. 1, is a fragmentary sectional side elevation of the meeting ends of a segmental shaft and its bearings to illustrate a lubricating system embodying my invention.
Fig. 2, is an enlarged end view of one form of traveler.
Fig. 3, is a transverse sectional view of a slightly modified form of traveler.
Fig. 4, is a similar view of a further modified form of traveler.
Fig. 5, is an enlarged sectional side elevation of the guide track and one of the supporting standards.

In carrying out my invention as embodied in Fig. 1, 2 and 3 represent two sections of a hollow revolving shaft, said sections being in endwise alignment so that they act as a conduit and these hollow shaft sections are internally threaded as indicated at 4.

The shaft sections are journalled in suitable bearings and two of these at the meeting ends of adjacent shaft sections, are shown and designated by the numeral 5. Between the bearings at the meeting ends of two shaft sections is formed a lubricant well 6 in which are housed the gears 7 and 8 on the ends of the shaft sections 2 and 3 respectively, the gear 8 meshing with a pinion 9 fixed to the shaft 10 on which is also fixed a pinion 11 meshing with the gear 7 so that the two shaft sections revolve in unison. Within the confines of the bearings 5 each shaft section has a number of lubricant ducts 12 leading from the bores to the exteriors of said shaft sections.

Through the center of the shaft sections runs a polygonal track 13 of any suitable shape other than round and this track is supported at intervals by standards 14 located in the space between the meeting ends of adjacent shaft sections and are preferably entirely housed within the lubricant well 6. On this track is mounted a flexible traveler 15 which is of a size to snugly fit the bores of the shaft sections and the same is exteriorly threaded as indicated at 16 so as to have threaded connection with said shaft sections. The traveler has a central bore 17 of rectangular or polygonal cross sectional shape corresponding to the shape of the track 13 so as to prevent rotation of the traveler relative to the track or the shaft section through which it is traveling and from this bore leads a slot 18 to permit passage of the traveler past the different standards 14. The travelers may be made of any suitable material that is flexible and will withstand the action of lubricating substances and as an example of such structure reference may be had to the ordinary and well known flexible metallic tubing. Of course it is to be understood that such traveler need be flexible only where the circuit through which such traveler moves is arcuate at certain points as will be more fully hereinafter set forth, whereas said traveler may be stiff or rigid where it moves always in straight lines.

As shown in Figs. 1 and 2, this traveler is made of a solid body, whereas in Fig. 3 a similar structure is illustrated but has antifriction devices or ball bearings 19 suitably mounted therein to bear upon the faces of the track so as to reduce friction between the contacting parts. In Fig. 4, a traveler is shown constructed of an exteriorly threaded tubular member 20 having spaced discs 21 mounted therein to form a core or supporting frame in which the holes and slots are formed for the track standards and these discs are provided with trunnions 22 by which the tubular body or casing 20 is connected with the discs.

The operation of this form of the invention is as follows: the traveler being held against rotation by the track 13 as the shaft sections revolve, said traveler will be threaded forward so as to move through the shaft sections propelling the lubricant before it through the bores of said shaft sections and as the traveler nears the bearings a portion of the lubricant will pass through the ducts 12 to said bearings for lubricating the same and as the traveler reaches the spaced ends of two adjacent shaft sections the excess lubricant will be forced into the well 6 which is maintained at a proper level to permit a certain amount thereof to be forced into the other shaft section as the traveler enters it. Such an arrangement provides for the positive lubrication of all parts adjacent the shaft through which the traveler passes regardless of whether said shaft is horizontal, vertical or set at any angle.

In Figs. 6 to 10 inclusive, I have shown a modification of my invention and for convenience of illustration, I have shown three hollow shaft sections 22, 23 and 24 with a lubricant well 25 between the meeting ends of the sections 22 and 23 and another well 26 between the meeting ends of the sections 23 and 24 and the two wells are illustrated in such close proximity that the traveler 27 projects into both of them but it is to be understood that in actual practice these wells may be many feet apart and the traveler may be in proximity to only one of these at a time. The shaft sections are revolved in unison in the same manner as those described with relation to Fig. 1 and the same numerals will be used for the gear trains.

The traveler in this form of the invention has a rectangular central bore 28 running entirely therethrough for registration with the rectangular track 29 passing through the hollow shaft sections which latter are threaded internally as at 29' for coaction with the external threads 30 on the traveler. In the traveler is formed a groove 31 running from the rectangular bore to the exterior of the traveler and from the rear end of said traveler to a point adjacent the front end and as the front end of this groove terminates short of the front end of the traveler a full or solid pushing head or surface is provided so that none of the lubricant may flow past said traveler.

Figures 6, 7, 8, 9, 10:
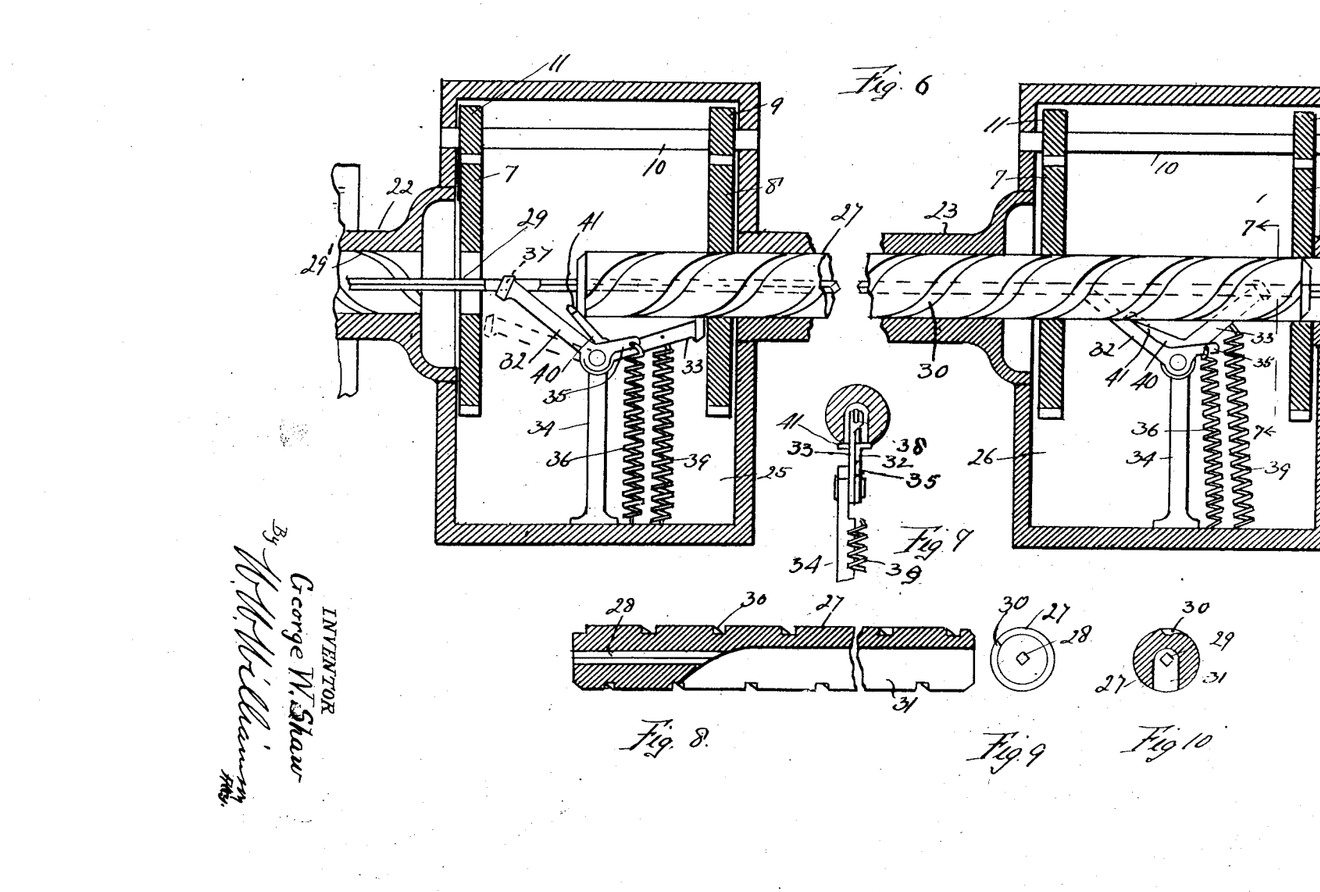
Fig. 6, is a fragmentary sectional side elevation of a modified form of my invention.
Fig. 7, is a detail sectional view at the line 7—7 of Fig. 6.
Fig. 8, is a fragmentary longitudinal sectional view of one of the travelers used with that form of the invention illustrated in Fig. 6.
Fig. 9, is a front end view thereof.
Fig. 10, is a cross sectional view of the same.

The track 29 is supported by either of two arms 32 and 33 at each space between adjacent shaft sections as here shown within each well. Both of these arms are pivoted to a single standard 34 and the arm 32 has a finger 35 projecting opposite the arm 32 to the other side of its pivot point and to this finger is connected one end of a spring 36 while the other end of said shaft is connected to some stationary point so that the action thereof tends to normally force the arm into engagement with the track for which purpose the end of the arm is notched as at 37 so as to straddle the track. The other arm 33 is likewise notched at its end as indicated at 38 for the same purpose but this arm is normally held out of engagement with the track by means of the spring 39 having one end connected to said arm and the other end to a stationary element. With this arm 33 is formed a leg 40 projecting in substantially an opposite direction or on the other side of its pivot point and said leg carries a foot 41 over which the traveler will ride to actuate the arm 33 against the action of the spring 39.

From the foregoing it will be seen that since the arm 33 is normally held out of the path of travel of the traveler 27 as well as out of engagement with the track by the spring 39 the traveler may pass over said arm but as soon as said traveler engages the foot 41 on the leg 40 said foot and leg will be depressed so as to force the arm 33 into the groove 31 of the traveler and cause said arm to engage the track as shown in connection with the track supporting means in the well 26. The arm 33 now being in engagement with the track as the traveler moves forward it will engage the arm 32 and force said arm out of engagement with the track depressing the same against the action of the spring 36 as shown by dotted lines with relation to the supporting means in well 25. The parts will remain in this position until the forward end of the groove 31 overlies the end of the arm 32 at which time the spring 36 will move said arm into re-engagement with the track as shown with relation to the supporting means in well 26. As the traveler passes beyond the supporting means the leg and foot associated with the arm 33 will be disengaged permitting the spring 39 to withdraw the arm 33 from the track leaving the path of travel of the traveler clear when next approaching the track supporting means.

Figures 11, 13:
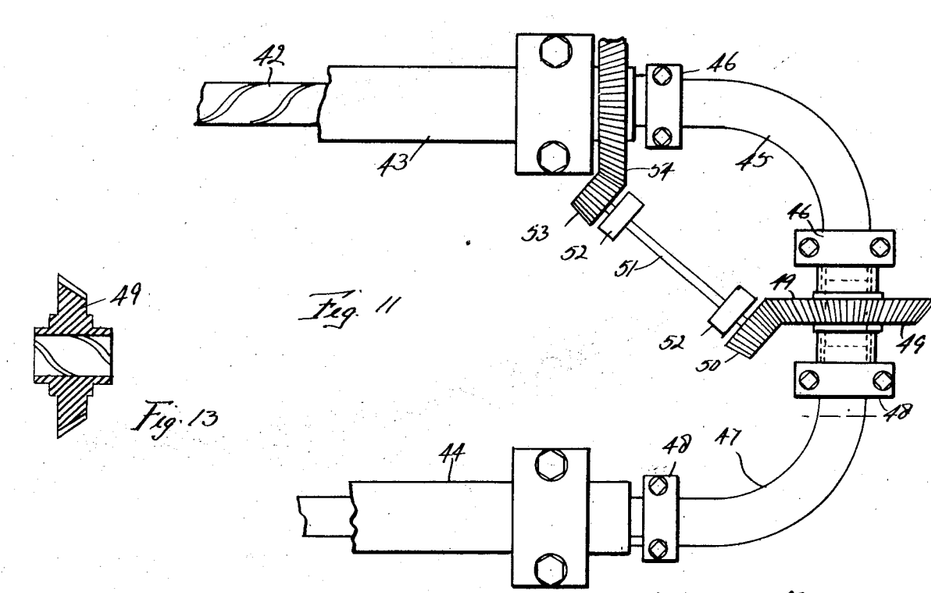
Fig. 11, is a fragmentary plan view of a mechanism for transferring travelers from one conduit to another.
Fig. 13, is a sectional view of one of the gears of the transfer mechanism.
Figure 12:
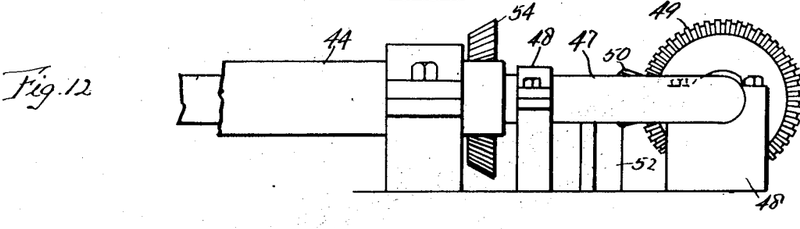
Fig. 12, is a side elevation thereof.

In Figs. 11 and 12, I have shown one method of completing a circuit for the travelers for use with those having flexible characteristics and wherein one traveler is designated by the numeral 42 for passage through the internally threaded shaft 43 identical with those hereinbefore described.

Coacting with the shaft 43 is another similar shaft 44 but which is revolving in a reverse direction to the shaft 43 and said shaft 44 may be used for transmitting power to machinery the same as the other shaft or it may be merely a return shaft to carry the traveler back to the starting point after passing through the shaft 43.

Aligning with one end of the shaft 43 is a smooth bore tubular member or conduit 45 which as here shown is of arcuate shape and is fixed in suitable supports 46 while with one end of the shaft 44 aligns another stationary smooth bore member or conduit 47 similar in all respects to member 45 and fixed in suitable supports 48. The adjacent ends of these two members are spaced apart and between said spaced ends is suitably journalled a beveled gear 49 having a threaded bore as plainly shown in Fig. 13 which coincides with the bores of the members 45 and 47 and said gear is located at a shorter distance from each of the shafts 43 and 44 than the length of the traveler 42 so that when a portion of said traveler is in either of the shafts another portion is within the bore of the gear 49 during the transfer of the traveler from one shaft to the other.

A bevel pinion 50 meshes with the bevel gear 49 and is fixed to one end of a shaft 51 journalled in suitable bearings 52 while on the other end of said shaft 51 is fixed another bevel pinion 53 meshing with a bevel gear 54 on one of the hollow shafts, as 43. As the shaft 43 revolves motion will be transmitted to the gear 49 so that said gear will travel in unison with said shaft.

From the foregoing it will be seen that as the traveler is propelled through the member 54 by the revolving of the shaft 43 the forward end of said traveler will be caused to enter the bore of the gear 49 and having threaded connection therewith, the revolving of such gear will cause the traveler to be moved forward until its forward end enters the shaft 44 through which it will be moved by its threaded connection with said shaft 44.

A similar transfer mechanism is provided at the opposite ends of the shafts so that the traveler may be transferred from the shaft 44 to the shaft 43 thereby completing a circuit.

In Figs. 14 to 17, I have shown a modified form of transfer mechanism which is particularly adapted for use with rigid travelers and in this structure 55 and 56 represent two hollow internally threaded revolving shafts through which a traveler is propelled as hereinbefore described.

Figures 14, 15, 16, 17:
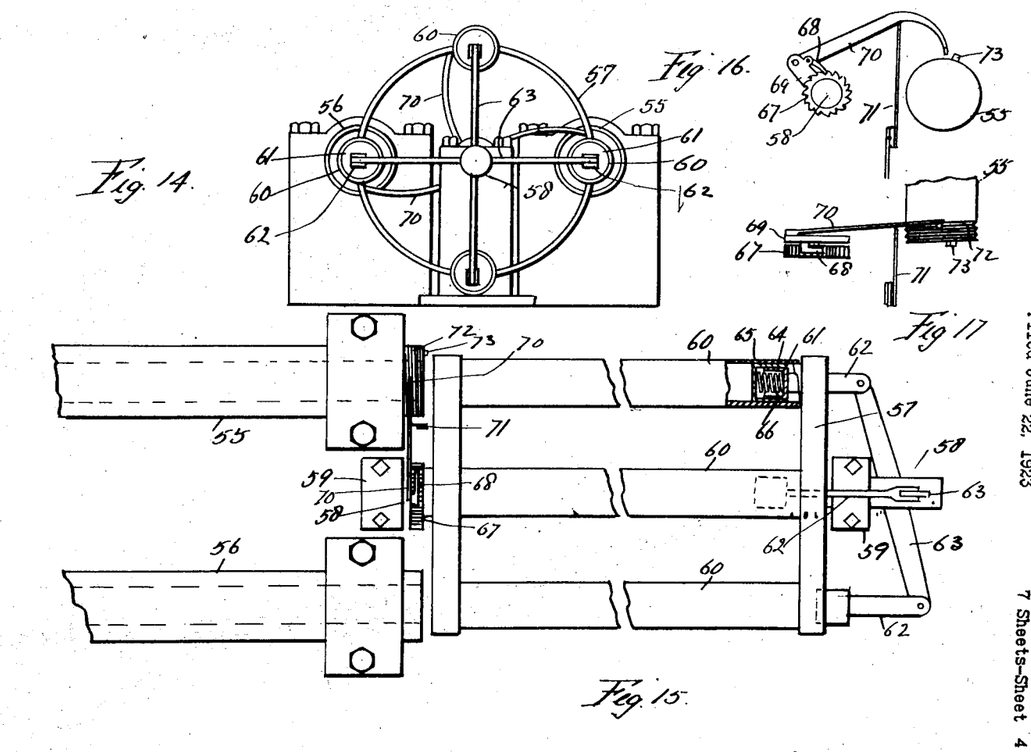
Fig. 14, is an end view of a modified form of transfer mechanism.
Fig. 15, is a sectional plan view thereof.
Fig. 16, is an enlarged detail end view of the controlling means for the transfer mechanism.
Fig. 17, is a plan view thereof.

Just beyond the ends of the shafts is revolubly mounted a frame or carrier 57 by means of a carrier shaft 58 which is journalled in suitable bearings 59 and this carrier includes a plurality of barrels or chambers 60 equally spaced and adapted to align with the shafts 55 and 56 in such manner that one barrel is in cooperative relation to each shaft at the same time. The inner ends or the ends of said barrels nearest the shafts 55 and 56 are open so as to receive and discharge the travelers and in these barrels are slidably mounted the suitable plungers 61 each having a stem 62 pivotally connected with the ends of walking beams 63. This construction causes two plungers in diametrically opposite barrels to work in unison in opposite directions so that the outward movements of one actuates the other and moves it inward. Each plunger preferably comprises two cuplike parts 64 and 65 one telescoping within the other and slidably mounted so as to be normally forced apart by a spring 66 housed within said parts.

A plunger constructed in this manner will take up the shock incident to a traveler being projected into one of the barrels 60 and will also permit the plunger to contract so that the walking beam may have its complete movement even though the movement of the traveler should be temporarily checked.

In order to revolve a carrier 57 so as to progressively bring the different barrels 60 into alignment with the shafts 55 and 56 the carrier shaft 58 has a ratchet 67 or its equivalent fixed thereto with which coacts a pawl 68 carried by the lever 69 the outer free end of which has a trigger 70 pivoted thereto supported on a resilient rest 71 and the nose of this trigger normally runs in the spiral groove or thread 72 on the outer end of the shaft 55 the latter also carrying a lug or projection 73 at the outer end of the spiral groove or thread 72. During the revolutions of the shaft 55, assuming the nose of the trigger 70 to be at the inner end of the spiral groove 72, said trigger will be gradually moved sidewise toward the outer end of the shaft 55 until said trigger is in the path of travel of the lug or projection 73 and when said lug or projection engages the trigger it will be moved longitudinally to actuate the carrier shaft 58 through the medium of the pawl and ratchet. During the movement of the trigger 70 the resilient rest 71 will be depressed but as soon as the parts have moved a sufficient distance for the lug 73 to become disengaged from the trigger 70 the resilient rest 71 will spring above its normal position and permit the trigger to again register with the inner end of the spiral groove 72 and because of the shape of the trigger said trigger and its component parts will return to their normal positions causing the pawl 68 to ride over the teeth of the ratchet and drop behind one of them ready for the next movement. These movements will continue intermittently until the two diametrically opposite barrels of the carrier align with the shafts 55 and 56.

The movements of the carriage being properly timed one of the barrels will align with the shaft 55 just prior to a traveler reaching the end of said shaft so that as it is ejected from such shaft it will enter the aligned barrel and as soon as the carrier engages the plunger in said barrel said plunger will be forced outward and impart an inward movement to the plunger in the diametrically opposite barrel which is in alignment with the shaft 56 and thus force the carrier out of the barrel into the shaft where it will be picked up by the threads and moved along. If by chance the threads on the traveler should not immediately align with the threads in the shaft 56 the parts of the piston forcing the traveler outward will be compressed permitting the walking beam to have a full movement and as soon as the shaft revolves a sufficient distance to cause the threads to align the plunger spring will act on the carrier to project it into the shaft 56.

Figures 18, 19, 20, 21, 22:
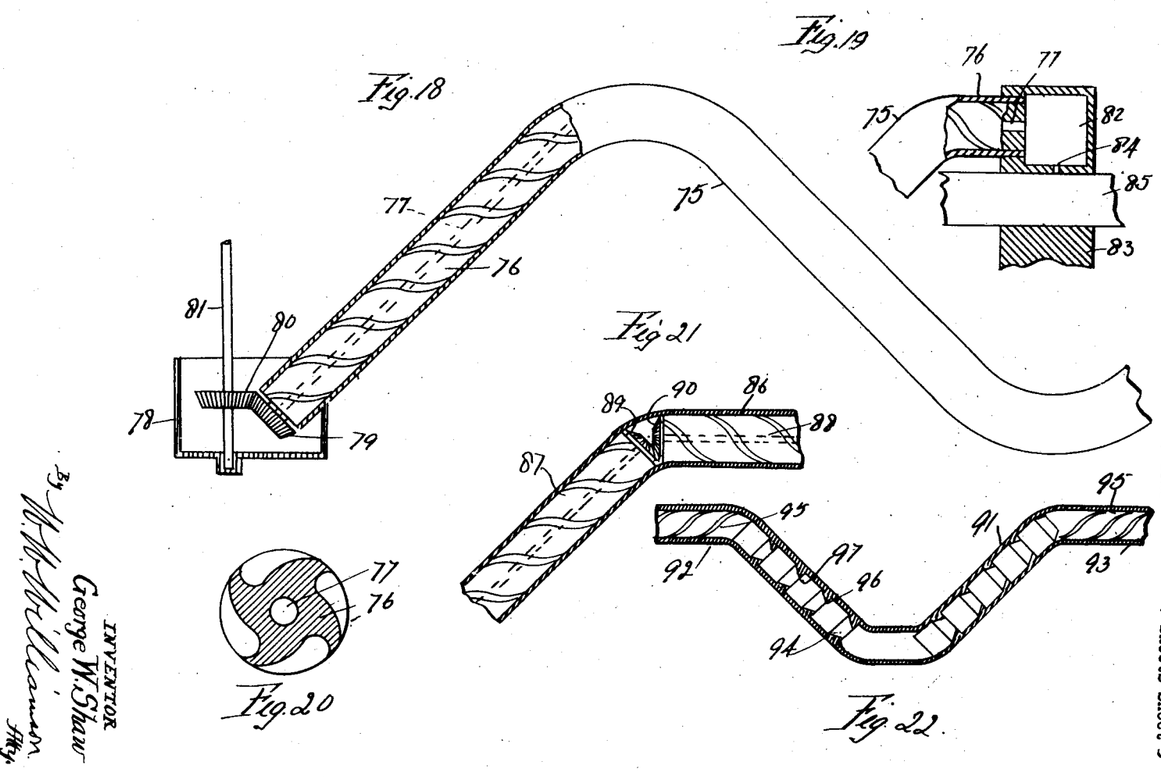
Fig. 18, is a fragmentary sectional side elevation of the lubricating system illustrating the use of a revoluble flexible screw showing the feed end.
Fig. 19, is a similar view of the delivery end.
Fig. 20, is an enlarged sectional view of the screw.
Fig. 21, is a fragmentary sectional side elevation of the screw feeding lubricator illustrating the use of rigid or inelastic feeding screws.
Fig. 22, is a sectional view of the means for preventing retrograde movement of the lubricant passing through a revolving crank.

In Figs. 18 and 19, I have shown two portions of a lubricating system in which 75 denotes a conduit in which is rotatably mounted a flexible screw 76 having a bore 77 running from one end to the other. At the feeding end of the conduit is a supply tank or reservoir 78 adapted to hold a quantity of lubricant and into which projects one end of the conduit 75.

To the screw 76, preferably at one end thereof, is fixed a gear 79 and as here shown this is located in the reservoir and meshes with a gear 80 fixed to a shaft 81 which is revolved in any suitable or well known manner for imparting motion to the screw through the gears.

The outer end of the conduit may enter a lubricant chamber 82 in a bearing 83 said bearing having an orifice 84 leading from the chamber 82 to the opening in which the shaft 85 is mounted.

As the screw 76 is revolved the lubricant in the reservoir 78 will be forced through the conduit to the chamber 82 from which point it will run on to the bearing surfaces of the operating parts while any excess lubricant will return through the bore 77 of the screw to the reservoir 78 thus preventing the lubricant in the chamber 82 from becoming over heated yet always maintaining a supply sufficient for lubricating purposes.

In Fig. 21, I have shown a construction which will permit the use of stiff or rigid sections of screws in a conduit having portions at angles to each other and in this form of the invention 86 represents a conduit having a stiff or rigid screw 87 in one portion and another stiff or rigid screw 88 in an adjacent portion while the meeting ends of these rigid screws have intermeshing bevel gears 89 and 90 fixed thereto for transmitting motion from one screw to the other and thereby forcing the lubricant through the conduit.

In Fig. 22, I have shown a hollow member 91 having two portions 92 and 93 in endwise alignment and between these portions or sections is an angular part or crank 94 which is also hollow and communicates with the sections 92 and 93. In the sections 92 and 93 which are generally in a horizontal position are formed the internal threads 95 whereby the revolving of said sections will cause the lubricant to follow the threads and thereby pass through said sections but in the offset or crank portion 94 are arranged a plurality of spaced annular projections or ribs 96 tapered internally so as to permit the lubricant to readily pass therethrough while providing shoulders 97 to obstruct the return of the lubricant, said shoulders always being at the front of the projections or ribs when considered with relation to the direction of travel of the lubricant. Thus it will be seen that as the lubricant is forced through the section 92 by the thread 95 it will enter the offset or crank portion 94 and when the crank portion is as shown in Fig. 22 the lubricant will run past the projections or ribs while when the crank portion is in the reverse position the lubricant will be prevented from running back by means of the shoulders 97 but will run down through the other portion of the crank toward the section 93 while being prevented from running backward through the same portion when the crank is in the position illustrated. After the lubricant has passed from the crank into the section 93 it is again forced forwardly by the threads 95 in said section 93.

Figure 23:
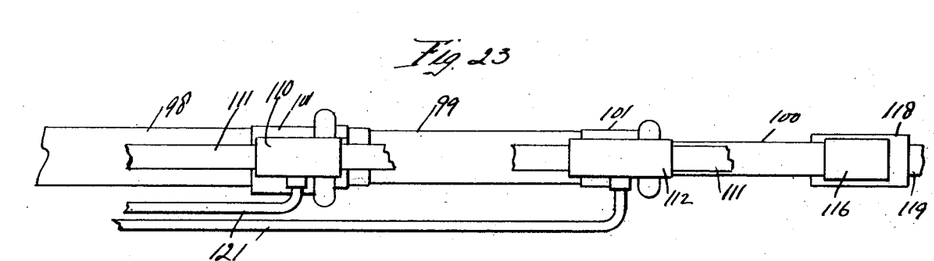
Fig. 23, is a fragmentary side elevation of a further modified structure for conveying lubricant.
Figure 24:
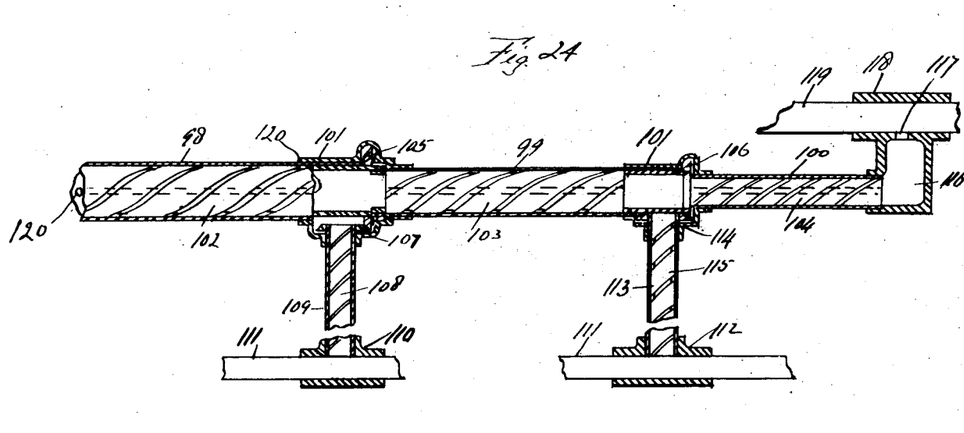
Fig. 24, is a longitudinal sectional plan view thereof.

In Figs. 23 and 24, I have illustrated a sectional screw the different sections of which vary in size for decreasing the amount of lubricant supplied to different parts of the system and have also shown different ways of distributing the lubricant to bearings at separated points and in different directions. In this form of the device, 98 represents a stationary hollow conduit, a similar conduit 99 in endwise alignment with the first one but of smaller diameter while 100 also denotes a similar conduit of smaller diameter than the second one and the meeting ends of adjacent conduits are mounted in suitable housings 101.

In each of the conduit sections 98, 99 and 100 are rotatably mounted rigid screws 102, 103 and 104 respectively and the meeting ends of adjacent screws are fastened together by means of gears 105 and 106 located within the housings. The gear 105 meshes with a complementary gear 107 within the same housing as the gear 105 and said gear 107 is fixed to a screw 108 revolubly mounted in a branch conduit 109 leading from the housing in which the gears 105 and 107 are located to a bearing 110 through which passes a shaft 111 and if this shaft passes through another bearing 112 the latter is connected to a conduit 113 which communicates with the housing enclosing gear 106, said gear meshing with a gear 114 on the screw 115 revolubly mounted in the conduit 113. The extreme end of the smallest conduit, as 100, may enter a lubricant chamber 116 and this in turn may communicate through a duct 117 with a bearing 118 for the shaft 119. In order to dispose of the excess lubricant which finally enters the lubricant chamber 116 each of the screws 102, 103 and 104 may have a central bore 120 all in endwise alignment so that said excess lubricant will return to the point of supply through said bores.

The lubricant entering the housings 100 will be distributed by the screws 106 and 116 to the bearings 110 and 112 and from these bearings a certain quantity of the lubricant may be distributed to other bearings by means of pipes 121 leading from said bearings or these pipes may be used merely as returns for lubricant entering the bearings 110 and 112 so that a continuous circulation may be maintained.

In Figs. 25 to 28, I have illustrated a further modification of my invention wherein 122 represents a hollow shaft revolubly mounted in suitable bearings one of which is shown at 123 and in the bore 124 of this shaft is arranged a screw 125 which is stationary and has a head 126 socketed in the end of the shaft with a portion remaining on the outside and in this head is formed a chamber 127 having a mouth 128 leading to the bore 124 and also communicating with the screw threads. The screw and its head are supported and retained in a stationary position by a suitable support 129.

Figures 25, 26, 27, 28:
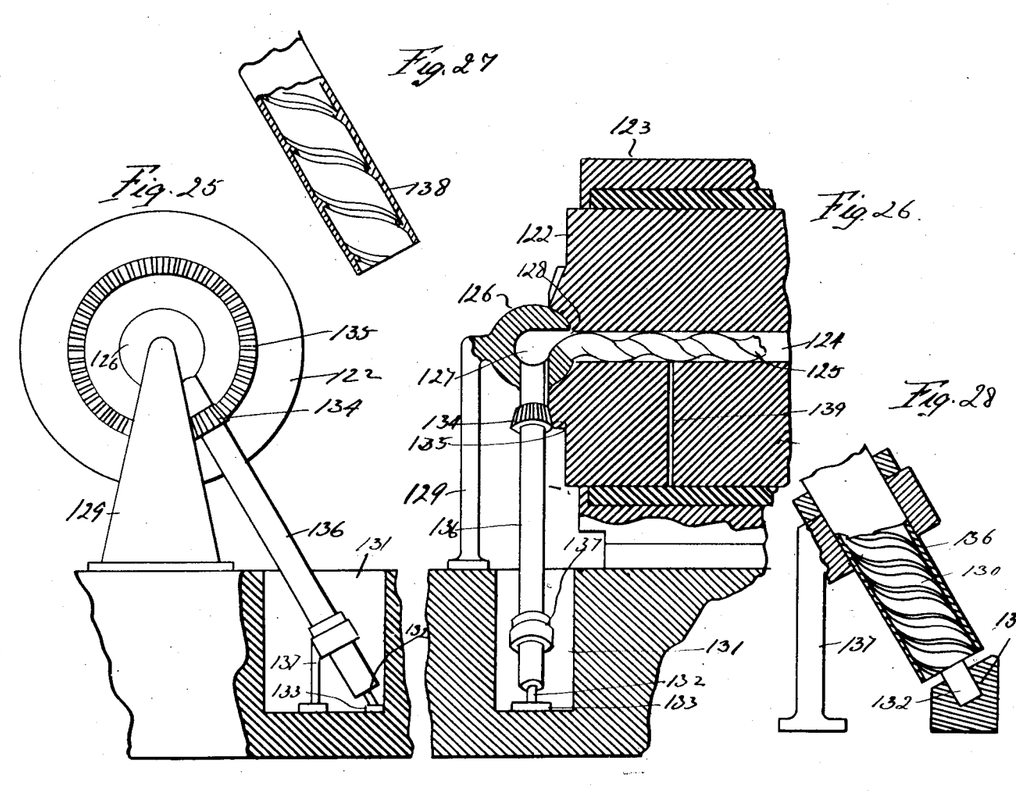
Fig. 25, is a fragmentary sectional end view of another form of lubricator.
Fig. 26, is a sectional side elevation thereof.
Fig. 27, is an enlarged fragmentary sectional side elevation of the elevator conduit.
Fig. 28, is a similar view of a slightly modified form of the elevator conduit.

A revolving screw 130, Fig. 28, runs from a well or reservoir 131, which is the source of lubricant supply to the chamber 127 in the head 126 of the screw 125 and a lower trunnion 132 of the screw 130 may be journaled in the thrust block 133. At some suitable point intermediate the ends said screw 130 has a gear 134 connected therewith which meshes with a ring gear 135 carried by the revolving shaft 122 in order that the revolving of said shaft will revolve the screw 130. The screw 130 is enclosed in a sectional conduit 136 one section being arranged between the head 126 and the gear 134 and another section between said gear and the well 131, the lower end of said last named section preferably projecting close to the bottom of the well and being supported by a bracket 137.

In lieu of the revolving screw 130 within the sectional conduit 136 I may use an internally threaded conduit 138 such as is shown in Fig. 27 and fix the gear 134 directly thereto so as to cause said conduit to revolve in unison with the shaft 122. In either case the object is to lift or convey the lubricant from the source of supply, reservoir or well 131 to the chamber 127 in the head of the stationary screw within the hollow shaft for distributing the lubricant to the different points to use as the bearings of the shaft 122, and when the lubricant reaches the region of said bearings it flows through a channel 139 running from the bore of the shaft to the exterior of said shaft.

Of course I do not wish to be limited to the exact details of construction as herein shown as these may be varied within the limits of the appended claims without departing from the spirit of my invention.

Having thus fully described my invention, what I claim as new and useful is:—

1. A lubricating system comprising an internally threaded conduit, an externally threaded traveler adapted to be propelled through the conduit by the revolutions of the latter, and means to prevent rotation of the traveler.

2. A lubricating system comprising in combination, a plurality of spaced internally threaded conduits, a track passing through said conduits, supports for said track located between the spaced ends of said conduits, and an externally threaded traveler having a central bore for registration with the track and having a groove leading from the bore to the exterior of the traveler to permit the passage of said traveler past the track supports, said traveler being held against rotation by the track and forced forwardly by the revolutions of the conduits due to the threaded connection between the conduits and traveler.

3. In a lubricating system, the combination of a plurality of internally threaded conduits in endwise alignment with the ends spaced apart, a track of rectangular cross section passing through the conduits, means for supporting the track at intervals, each of said means comprising a standard 2, spring actuated arms pivoted to said standard and having bifurcated ends to engage the track at separated points, one of said arms having a leg and foot formed therewith whereby movement of said foot and leg will actuate the arm, and an externally threaded traveler for threaded engagement with the conduits and having a rectangular bore for registration with the track and further provided with a longitudinal slot running from the rear end of the traveler to a point adjacent the front end thereof, said slot running from the traveler bore to the exterior surface, the passage of the traveler through the conduits engaging a foot to force one of the arms against the action of its spring into the slot of the traveler for engagement with the track and next engaging the other arm to force it out of engagement with the track against the action of its spring.

4. As an article of manufacture in a lubricating system, a flexible externally threaded traveler to be screwed through a conduit and having a bore and slot for registration with a track and its supports, said track preventing rotation of the traveler.

5. A lubricating system comprising in combination, a pair of coacting internally threaded conduits, travelers having threaded connection with said conduits whereby the revolutions of the latter will cause the traveler to proceed therethrough, means within the conduits to prevent rotation of the travelers, and means for transferring a traveler from one conduit to the other.

6. In a lubricating system, the combination of a pair of parallel revoluble internally threaded conduits, carriers having threaded connection with said conduits to be screwed therethrough by the revolutions thereof, a carrier located at the ends of said conduits, barrels forming parts of said carrier two of which are adapted to simultaneously align with said conduits one of which is adapted to receive a carrier as the same is ejected from the end of the conduit, plungers in said barrels, means for connecting said plungers in pairs whereby the outward movement of one will force the complementary one inward and thereby project a carrier from a barrel into the other conduit, and means for transmitting motion from one conduit to the carrier for rotating the latter.

In testimony whereof, I have hereunto affixed my signature.

GEORGE W. SHAW.